United States Patent Office.

CHARLES P. WILLIAMS, OF PHILADELPHIA, PENNSYLVANIA, ASSIGNOR TO HIMSELF AND GEORGE T. LEWIS, OF SAME PLACE.

Letters Patent No. 71,256, dated November 19, 1867.

IMPROVEMENT IN THE MANUFACTURE OF PHOSPHATE OF SODA AND OTHER PRODUCTS.

The Schedule referred to in these Letters Patent and making part of the same.

TO ALL WHOM IT MAY CONCERN:

Be it known that I, CHARLES P. WILLIAMS, of the city of Philadelphia, State of Pennsylvania, chemist, have discovered a new and useful Method of Manufacturing Phosphate of Soda and other Phosphates; and I do hereby declare that the following is a full, clear, and exact description of the same.

My invention or discovery consists in the manufacture of the phosphate of soda and other phosphates from apatite, or the various phosphatic guanos, and from cryolite.

The method consists in heating, either in a muffle or a reverberatory furnace, at a temperature of not less than a dull-red heat, a mixture of the phosphates and cryolite in equivalent proportions, whereby a double decomposition ensues, producing phosphate of soda, alumina, and fluoride of calcium. It is not necessary to fuse the materials. The cold mass is lixiviated, whereby the phosphate of soda is dissolved, and the other products remain insoluble. The phosphate of soda is either crystallized or treated with a solution of caustic lime, lime-water, or with milk of lime, in equivalent proportions, by which a solution of caustic soda is produced, together with a chemically precipitated phosphate of lime, the latter in a condition suitable for a fertilizer, being, from its minute division, assimilable by plants.

What I claim as my invention, and desire to secure by Letters Patent, is—

The art or manufacture of the phosphate of soda and other phosphates by the process or method herein shown and described.

CHAS. P. WILLIAMS.

Witnesses:
LEWIS STOVER,
B. A. HOOPES.